US009838669B2

(12) United States Patent
Corral-Soto (10) Patent No.: US 9,838,669 B2
(45) Date of Patent: Dec. 5, 2017

(54) APPARATUS AND METHOD FOR DEPTH-BASED IMAGE SCALING OF 3D VISUAL CONTENT (75) Inventor: Eduardo R. Corral-Soto, Toronto (CA)

(73) Assignee: STMICROELECTRONICS (CANADA), INC., Ottawa (CA)

( * ) Notice: Subject to any disclaimer, the term of this patent is extended or adjusted under 35 U.S.C. 154(b) by 637 days.

(21) Appl. No.: 13/592,963

(22) Filed: Aug. 23, 2012

(65) Prior Publication Data
US 2014/0055446 A1 Feb. 27, 2014

(51) Int. Cl.
H04N 13/02 (2006.01)
G06T 15/00 (2011.01)
G06T 3/40 (2006.01)
G06T 15/40 (2011.01)

(52) U.S. Cl.
CPC ............ *H04N 13/026* (2013.01); *G06T 3/40* (2013.01); *G06T 3/4007* (2013.01); *G06T 15/00* (2013.01); *G06T 15/405* (2013.01); *G06T 2207/10028* (2013.01); *H04N 13/0275* (2013.01)

(58) Field of Classification Search
CPC combination set(s) only.
See application file for complete search history.

(56) References Cited

U.S. PATENT DOCUMENTS

| 8,514,225 B2* | 8/2013 | Genova | 345/422 |
| 2004/0032980 A1* | 2/2004 | Harman | 382/154 |
| 2009/0219383 A1 | 9/2009 | Passmore | |
| 2012/0062548 A1 | 3/2012 | Pan et al. | |
| 2012/0113093 A1 | 5/2012 | Liao et al. | |
| 2012/0139907 A1* | 6/2012 | Lee et al. | 345/419 |
| 2013/0027513 A1 | 1/2013 | Corral-Soto | |
| 2014/0092221 A1* | 4/2014 | Nagai | 348/51 |

FOREIGN PATENT DOCUMENTS

| EP | 2 451 176 A2 | 5/2012 |
| JP | 2002-358542 A | 12/2002 |
| JP | 2009-500878 A | 1/2009 |
| JP | 2009-53748 A | 3/2009 |
| JP | 2010-206362 A | 9/2010 |

\* cited by examiner

Primary Examiner — Robert Craddock
(74) Attorney, Agent, or Firm — Seed IP Law Group LLP (57) ABSTRACT A system for performing depth-based scaling of 3D content. The system comprises: 1) a content source configured to provide an input image comprising a plurality of input image objects; and 2) a processor configured to receive the input image and to receive a depth map comprising depth data associated with each of the plurality of input image objects. The processor generates an output image comprising a plurality of output image objects, wherein each of the plurality of output image objects corresponding to one of the plurality of input image objects. The processor scales a size of a first output image object relative to the size of a second output image object based on depth data associated with the first output image object and the second output image object.

20 Claims, 4 Drawing Sheets

APPARATUS AND METHOD FOR DEPTH-BASED IMAGE SCALING OF 3D VISUAL CONTENT

CROSS-REFERENCE TO RELATED APPLICATION(S)

The present application is related to U.S. patent application Ser. No. 13/556,969, filed Jul. 24, 2012, entitled "APPARATUS AND METHOD FOR ADJUSTING THE PERCEIVED DEPTH OF 3D VISUAL CONTENT", which claims priority to U.S. Provisional Application Ser. No. 61/511,380, filed Jul. 25, 2011. Both applications are hereby incorporated by reference into the present application as if fully set forth herein.

TECHNICAL FIELD OF THE INVENTION

The present application is related to systems and methods that enable the viewer of 3D content to adjust the perceived depth of the 3D content using depth-based image scaling (DBIS).

BACKGROUND OF THE INVENTION

Three-dimensional (3D) movies and videos are becoming increasing prevalent in the marketplace. When a stereoscopic 3D movie or video is created, two different views of a scene are either captured by physical stereoscopic cameras or artificially generated by means of computer graphics. Typically, the distance (baseline) between the cameras is kept fixed during production according to the 3D visual effects desired by the filmmaker. At the time of viewing the 3D movie or video (e.g., on a 3D television by wearing active or passive 3D glasses), a viewer will experience a "default" depth perception effect as planned by the film or video maker.

Stereoscopic 3D content can be processed in order to perform artificial adjustments to the cameras baseline (manipulation of the stereo visual cue) by means of synthesis of novel left and right views. This enables the 3D movie of video viewer to adjust (increase or decrease) the perceived depth to a point that makes the viewer feel more comfortable when viewing the 3D content. However, sometimes the perceived changes in depth are small. This problem often occurs because a single visual cue (stereo) is being manipulated. For example, the perceived depth in a scene may be increased by increasing the baseline. However, the spatial dimensions of the objects in the image remain fixed. Thus, although one can observe the depth range being expanded, one does not feel that close objects become closer. Therefore, there is a need in the art for an improved apparatuses and methods for adjusting the perceived depth of 3D video content.

SUMMARY OF THE INVENTION

A system is provided for performing depth-based scaling of 3D content. In an advantageous embodiment, the system comprises: 1) a content source configured to provide an input image comprising a plurality of input image objects; and 2) a processor configured to receive the input image and to receive a depth map comprising depth data associated with each of the plurality of input image objects. The processor generates an output image comprising a plurality of output image objects, wherein each of the plurality of output image objects corresponding to one of the plurality of input image objects. The processor scales a size of a first output image object relative to the size of a second output image object based on depth data associated with the first output image object and the second output image object.

A method is provided for performing depth-based scaling of 3D content in response to a viewer input control signal. The method comprises: 1) receiving an input image comprising a plurality of input image objects; 2) receiving a depth map comprising depth data associated with each of the plurality of input image objects; and 3) generating an output image comprising a plurality of output image objects, each of the plurality of output image objects corresponding to one of the plurality of input image objects, and wherein a size of a first output image object is scaled relative to the size of a second output image object based on depth data associated with the first output image object and the second output image object.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF THE INVENTION

FIGS. 1 through 4, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged 3D content processing system.

The present disclosure describes systems, apparatuses and methods that address the problems mentioned above by enabling a 3D movie (or video) viewer to adjust (i.e., increase or decrease) the perceived depth to a point that makes the viewer feel more comfortable when viewing the 3D content. In particular, the present disclosure describes systems, apparatuses and methods that: i) reuse or share a low-cost disparity estimator from a motion-compensated temporal interpolation frame rate conversion engine, ii) decrease or increase the perceived depth via a scaling parameter, as well as applying a depth offset, iii) avoid the use of a dedicated occlusion handling system on the stereoscopic images, and iv) use a low-cost model-based warping (MBW) engine that produces high quality stereoscopic image synthesis. In an exemplary embodiment, a system according to the principles of the present disclosure may be fully implemented in hardware on an application-specific integrated circuit (ASIC).

Figure 1:
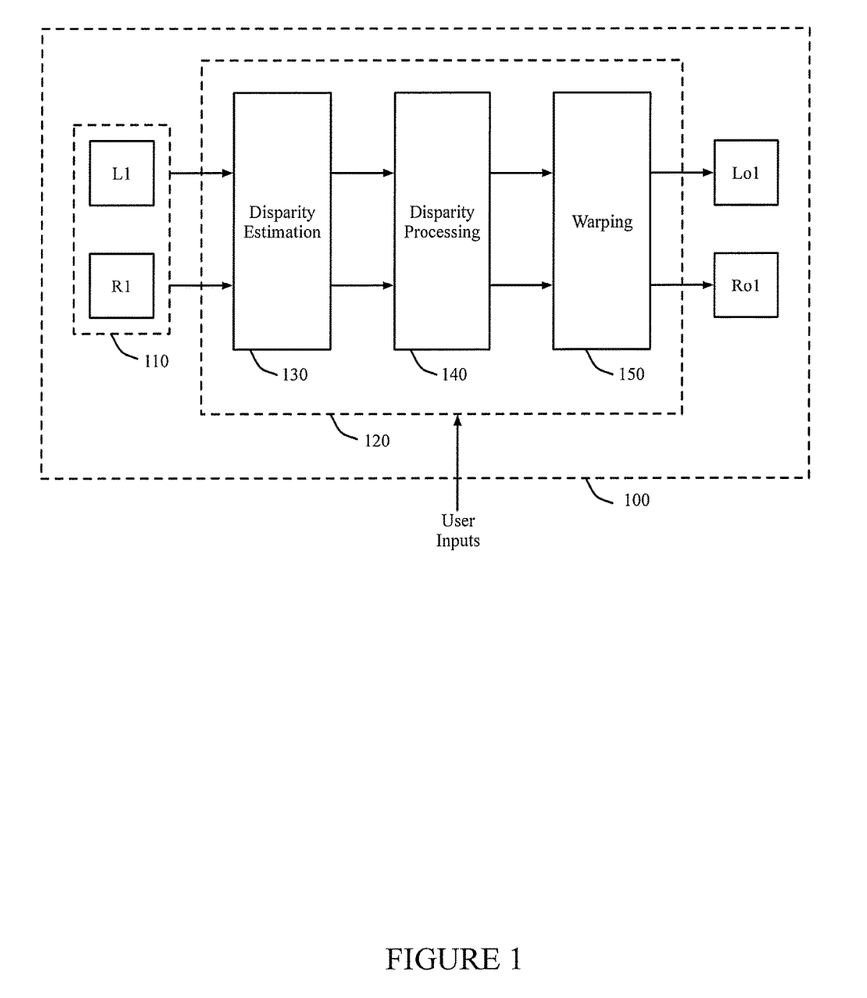
FIG. 1 illustrates a high-level diagram of a video depth control (VDC) system in accordance with the described embodiments.

FIG. 1 illustrates a high-level diagram of system 100, which comprises video depth control (VDC) system 120 in accordance with the described embodiments. System 120 was previously described in U.S. patent application Ser. No. 13/556,969, filed Jul. 24, 2012, and was previously incorporated by reference above. System 100 may comprise any of a number of different devices that are capable of performing three-dimensional (3D) image processing. By way of example and not limitation, system 100 may comprise a 3D television set, a digital video recorder (DVR), a digital versatile disc (DVD) player, a computer system capable of executing 3D video applications, a video projector, or any similar device. System 100 comprises 3D content source 110 and VDC system 120. VDC system 120 comprises disparity estimation circuitry 130, disparity processing circuitry 140 and warping engine circuitry 150. 3D content source 110 provides 3D image data to VDC system 120. In an exemplary embodiment, the 3D image data may comprises a pair of input left and right stereoscopic images, respectively L1 and R1. VDC system 120 generates a pair of output left and right stereoscopic images, respectively Lo1 and Ro1.

The nature of 3D content source 110 will vary depending on system 100. By way of example and not of limitation, if system 100 is a DVD player, 3D content source 110 may be a digital versatile disc. If system 100 is a DVR machine, 3D content source 110 may be a large magnetic storage disc. If system 100 is a computer, 3D content source 110 may be an internal or external hard drive. If system 100 is a 3D television set, 3D content source 110 may be a cable connection that provides the input left (L1) and input right (R1) stereoscopic images.

There are two basic methods for producing a perceived depth change on stereoscopic content (i.e., L1 and R1). The first method is based on shifting the whole depth range "inwards" or "outwards" with respect to the screen surface. This method is known as Horizontal Image Translation. The second method is based on artificial changes of the baseline (separation) of the stereo cameras, where intermediate left and right images are synthesized. The present disclosure describes a system that supports both the baseline method and the Horizontal Image Translation method.

Accordingly, in FIG. 1, L1 and R1 represent a pair of input left and right stereoscopic images, respectively, and Lo1 and Ro1 represent a new pair of synthesized stereoscopic left and right images, which produce an increased or decreased perceived depth effect, with respect to the default depth effect produced by L1 and R1, when viewed by the user. Disparity estimation circuitry 130 computes stereo correspondences between L1 and R1, disparity processing circuitry 140 performs conditioning of the computed disparities, and warping engine circuitry 150 warps the input images and performs interpolation in order to synthesize the output images Lo1 and Ro1. VDC system 120 receives user input control signals that control the amount of change in the perceived depth. In an exemplary embodiment, the user input control signals may be provided by a remote control (not shown) operated by the viewer.

Disparity Estimation Circuitry 130—

VDC system 120 may receive motion estimation information from an MCTI engine (not shown) that is coupled to VDC system 130 in order to compute disparities in stereoscopic images. The disparities are effectively the horizontal component of the vectors computed from a stereoscopic image pair L1 and R1. Disparity estimation circuitry 130 computes two disparity fields: L-R (from left-to-right) and R-L (from right-to-left). It is assumed that the input images L1 and R1 are already rectified by means of some epipolar rectification mechanism (in order to emulate aligned stereo cameras to simplify the matching process).

Disparity Processing Circuitry 140—

After the disparities are computed, an adaptive 2D filtering mechanism is applied. In an exemplary embodiment, a bank of two-dimensional filters with different shapes may be used in order to filter the decimated disparity arrays adaptively depending upon the local structure of the disparities. A structure analysis stage may be used in order to select the proper filter according to the local characteristics of the disparities region. Such an adaptive filtering mechanism is designed to fill in the existing occlusion areas in the disparity array while minimizing distortions on the synthesized output images. After filtering, the disparity fields are up-scaled to the original image dimensions. Next, the actual values of the disparities are adjusted in two ways: 1) the disparities are multiplied by a scale factor that has a range comprising both negative and positive values (including zero), and 2) an offset (negative or positive) is added to the disparities. These two adjustments enable the user to adjust the perceived depth when viewing the final 3D outputs.

Model-Based Warping (MBW) Engine Circuitry 150—

After the values of the disparities have been scaled by the user control scaling factor, a new pair of stereoscopic images, Lo1 and Ro1, may be synthesized. Warping engine circuitry 150 is based on the use of transformation models that model how a first region of an input image is mapped onto an equivalent region in the warped image. A warped image may have a greater vertical dimension than an input image and also may have a greater horizontal dimension than an input image 310.

Let "p" be a point in an input image. A transformed point, "q", is obtained in a warped image by applying a transformation function: $q=T[p]$. The transformation function, $T[\ ]$, is a model with its respective parameters. Exemplary models may include, but are not limited to, the following: i) 2nd-degree polynomials (conics) in x and y; and ii) Affine models. These models may be used for the cases where the disparities have both vertical and horizontal components (i.e., when the input images are not aligned or pre-rectified). For the specific case when the vertical component of the disparities is zero (i.e., when using aligned or pre-rectified stereo images, a simplified version of the affine transformation may be used:

$$H = \begin{bmatrix} a & b & c \\ 0 & 1 & 0 \\ 0 & 0 & 1 \end{bmatrix}$$

The present disclosure provides additional depth-based image scaling (DBIS) techniques that may be combined with the video depth control (VDC) techniques described above and in related U.S. patent application Ser. No. 13/556,969, which was incorporated by reference above.

The present disclosure provides apparatuses and methods for adjusting the spatial scales (sizes) of at least some selected objects in an image based on the depths of those selected objects. For example, an object that is close to the viewer is scaled spatially so that it occupies a larger area in the image and is therefore perceived to be even closer to the viewer. Thus, in this case, a perspective or scaling cue is manipulated. This, however, can be combined with the baseline adjustment method or with the manipulation of other depth cues, such as texture, shading, and the like, in order to improve the perceived depth changes experienced by the viewer. The advantages provided by the present disclosure are: 1) enhancement of the adjustment of perceived depth by allowing the sizes of objects to change according to their depths; and 2) the system can be combined with other forms of depth adjustment, such as baseline-based view synthesis.

There are two well-known methods for producing a perceived depth change on stereoscopic content. The first one is based on shifting the whole depth range inwards or outwards with respect to the screen surface. This method is known as "Horizontal Image Translation". The second method is based on artificial changes of the baseline (separation) of the stereo cameras where novel, intermediate left and right images are synthesized.

The present disclosure does not use either of these two techniques. Instead, the present disclosure describes systems and methods for performing spatial scaling of the objects in the image according to their assigned depth (disparity).

Figure 2:
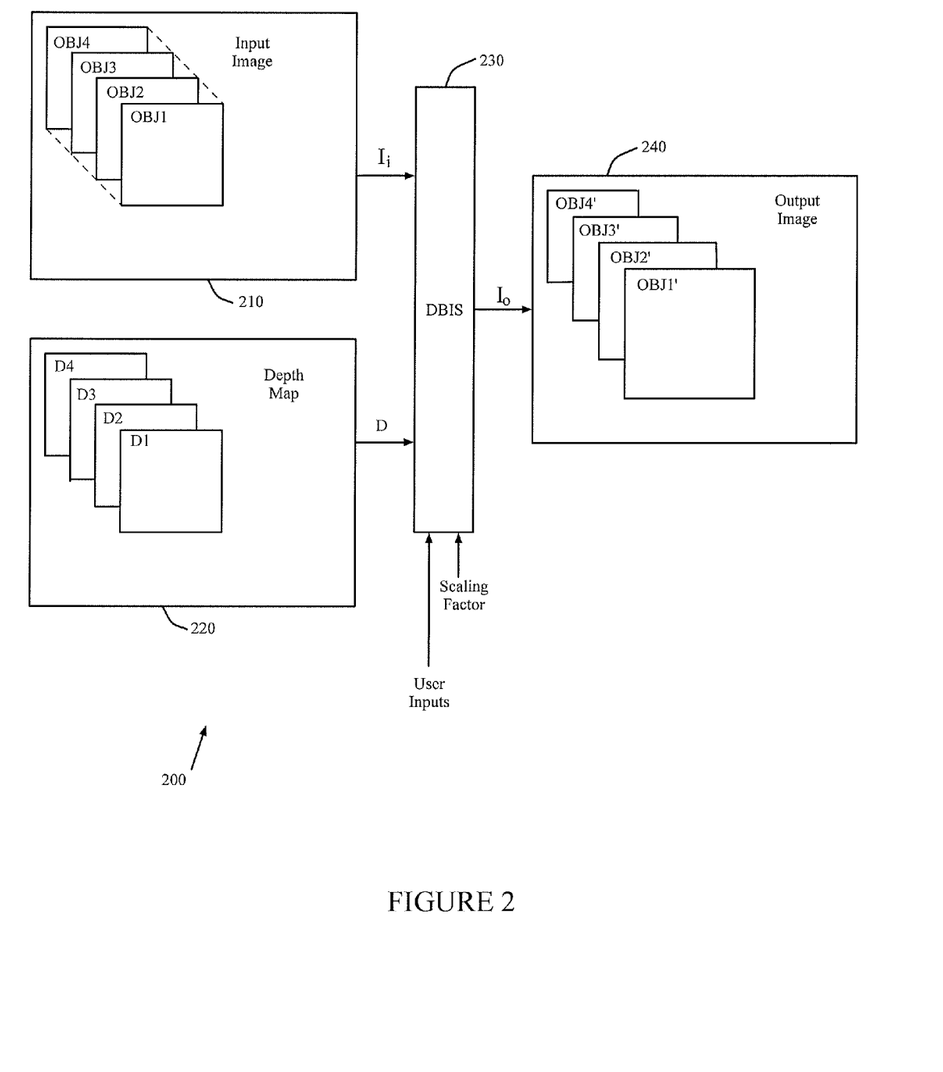
FIG. 2 illustrates a high-level diagram of a depth-based image scaling (DBIS) system in accordance with the described embodiments.

FIG. 2 illustrates a high-level diagram of a depth-based image scaling (DBIS) system 200 in system 100 in accordance with the described embodiments. DBIS system 200 comprises depth-based image scaling (DBIS) processor 230 that receives input image 210 and depth map 220 and generates therefrom output image 240. In FIG. 2, it is assumed that the disparity map of input image 210 is available.

DBIS system 200 enables the viewer of the 3D content to use a viewer input device (e.g., a TV remote control) to make adjustments (increase or decrease) to the spatial scales (i.e., sizes) of the objects in the image based on their depth in order to make them look a bit farther or a bit closer to the viewer. Thus, in this case, a perspective (or scaling) cue is manipulated. This, however, can be combined with a baseline adjustment method or with the manipulation of other depth cues, such as depth from texture, shading, and the like in order to improve the perceived depth changes experienced by the viewer.

The inputs to the proposed depth-based image scaling (DBIS) system 200 disclosed herein are: 1) input image 210; and 2) the corresponding depth map 220 of input image 210; and 3) user input control parameters. In FIG. 2, input image 210 may be either a left input image or a right input image from a stereoscopic image pair.

In input image 210, four (4) objects are indicated: OBJ1, OBJ2, OBJ3 and OBJ4. For ease of explanation, these four objects are presented as rectangles arranged at various depths. Object OBJ1 is closest to the viewer and is disposed in front of Object OBJ2. Object OBJ2 is disposed in front of Object OBJ3 so that Object OBJ2 is closer to the viewer than Object OBJ3. Object OBJ3 is disposed in front of Object OBJ4 so that Object OBJ3 is closer to the viewer than Object OBJ4. Thus Object OBJ1 is closest to the viewer and Object OBJ4 is farthest from the viewer. Each one of Objects OBJ1, OBJ2, OBJ3 and OBJ4 has corresponding depth information D1, D2, D3 and D4, respectively, as shown in depth map 220.

Depth-based image scaling (DBIS) processor 230 receives input image 210 and depth map 220. The output of DBIS processor 230 is a synthesized image, namely output image 240, where the Objects OBJ1, OBJ2, OBJ3 and OBJ4 have been scaled according to their corresponding depths. Although FIG. 2 is not to scale, it is intended to convey that the closest object (OBJ1) in input image 210 has been increased the most (as OBJ1'), while the farthest object (OBJ4) has been increased the least or not at all (as OBJ4'). DBIS system 200 may be implemented in an Application-Specific Integrated Circuit (ASIC).

In FIG. 2, it is assumed that depth map 220 is available. DBIS processor 230 quantizes depth map 230 into K levels or layers where i∈{1, 2, . . . , K}. Each layer $l_i$ covers a region $R_i$ (i.e., a set of image locations) from input image 210, or "I". Therefore, $I=\{I_{R1} \cup I_{R2} \cup \ldots \cup I_{RK}\}$, which means that the image I is composed of all the sub-images $I_{Ri}$. For example, in FIG. 2, depth map 220 has originally five layers, including the four layers of Objects OBJ1, OBJ2, OBJ3 and OBJ4, plus the background layer. If no quantization is done, then each layer in depth map 230 will correspond to a sub-image $I_{Ri}$ in image I.

Figure 3:
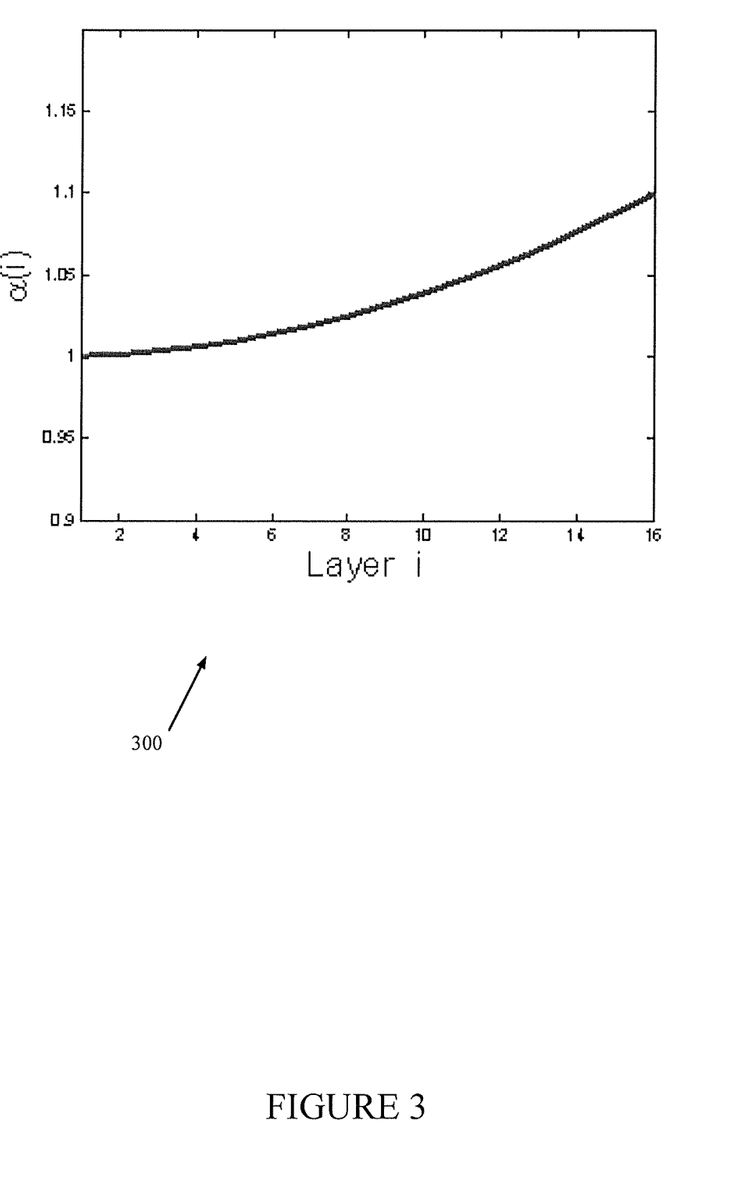
FIG. 3 is an exemplary monotonically increasing function that defines a set of scaling factors used in a depth-based image scaling (DBIS) system in accordance with the described embodiments.

FIG. 3 is an exemplary monotonically increasing function that defines a set of scaling factors used in depth-based image scaling (DBIS) system 200 in accordance with the described embodiments. After the quantizing step above, DBIS processor 230 next performs individual spatial two-dimensional (2D) scaling of each of the sub-images $I_{Ri}$. Each sub-image is scaled (horizontally and vertically) by its corresponding scaling factor $\alpha_i$. The set of scaling factors $S=\{\alpha_i, \alpha_2, \alpha_3, \ldots, \alpha_K\}$ may be defined by means of a 1-D function as shown in FIG. 3. The function in FIG. 3 is a monotonically increasing function. DBIS processor 230 performs the individual scaling of each sub-image $I_{Ri}$ in order to produce its scaled version $I'_{Ri}$. DBIS processor 230 starts the scaling process from the layer corresponding to the image surface (i.e., zero depth), for example, depth D1 in depth map 220. By processing and scaling the farthest objects first, the scaling factor at layer i will be greater than that of layer i−1. Thus, the outer areas of the scaled sub-image $I'_{Ri}$ will overlap (overwrite) some area from the previous sub-image $I'_{Ri-1}$, which is desirable to avoid holes.

The focus of expansion (FOE) $\vec{x}$ is programmable. It may be defined based on the centroid of the closest object or it may be set to the image center. During the scaling of each sub-image, $\vec{x}$ is subtracted from the image coordinates, and the result is centered back at $\vec{x}$.

Post Processing—

The overlapping due to scaling mentioned above effectively helps to avoid the appearance of holes in the output synthesized images. However, the final image may still contain a number of holes. DBIS processor 230 may mitigate this problem by applying median filtering to the output image.

In an advantageous embodiment of the disclosure, DBIS system 200 may combined with a stereo baseline-based depth adjustment method, the manipulated cues will support each other producing an enhanced depth adjustment experience as desired.

Figure 4:
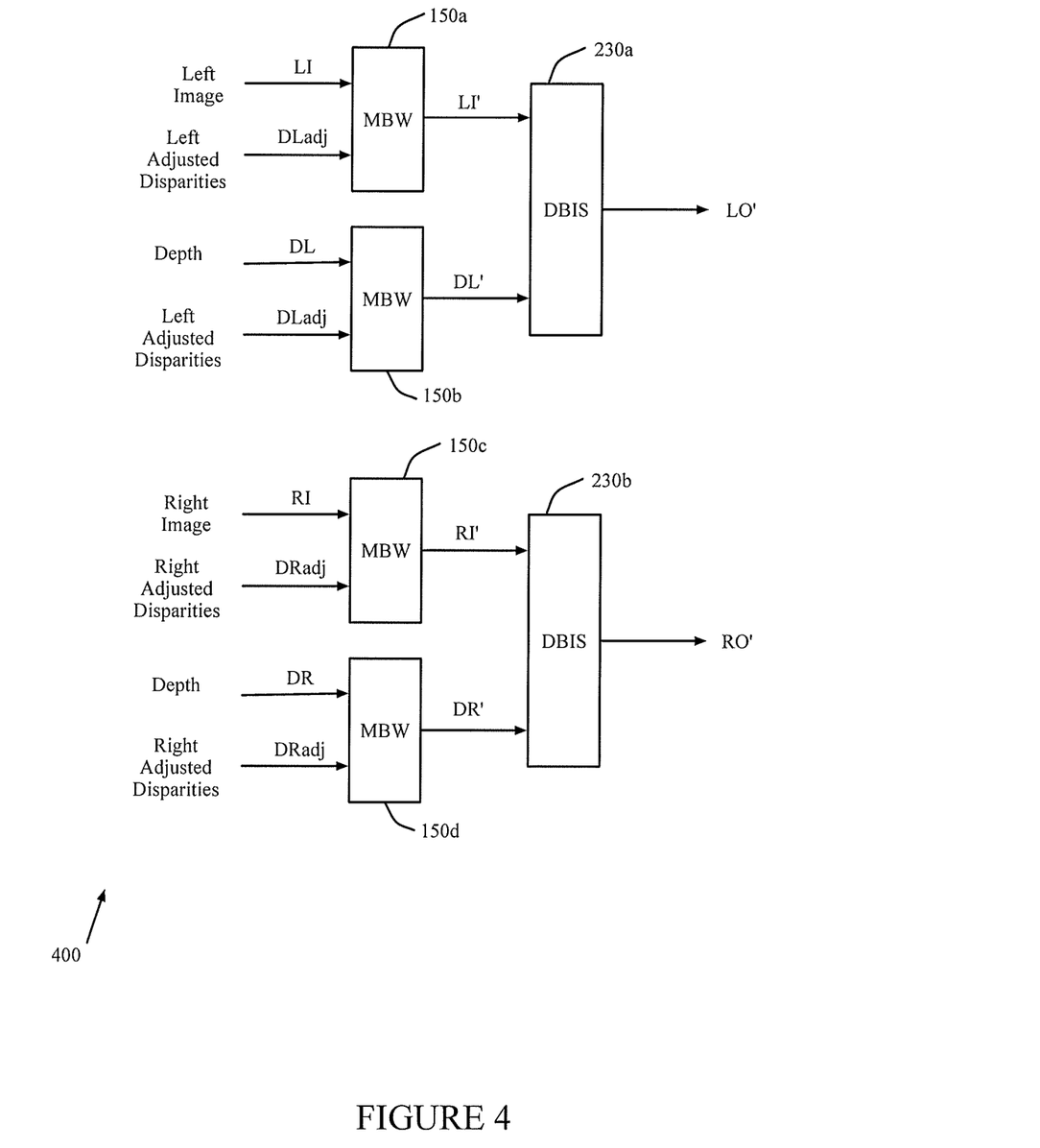
FIG. 4 illustrates a high level exemplary diagram of a combined video depth control (VDC) system and depth-based image scaling (DBIS) system in accordance with the described embodiments.

FIG. 4 illustrates a high level exemplary diagram of a combined video depth control (VDC) system and depth-based image scaling (DBIS) system in accordance with the described embodiments. An exemplary VDC system was previously described in U.S. patent application Ser. No. 13/556,969 and is discussed further in FIG. 1 above. In FIG. 4, a left input image and a right input image are processed together.

Model-based warping (MBW) engine 150*a* receives the left input image LI on a first input and receives left adjusted disparities (DLadj) data from disparity processing block 140 on a second input to produce a warped left input image LI'. Similarly, MBW engine 150*b* receives left depth map DL corresponding to the left input image LI on a first input and receives left adjusted disparities (DLadj) data from disparity processing block 140 on a second input to produce a warped left depth map DL' corresponding to the warped left input image LI'.

Model-based warping (MBW) engine 150*c* receives the right input image RI on a first input and receives right adjusted disparities (DRadj) data from disparity processing block 140 on a second input to produce a warped right input image RI' Similarly, MBW engine 150*d* receives right depth map DR corresponding to the right input image RI on a first input and receives right adjusted disparities (DRadj) data from disparity processing block 140 on a second input to produce a warped right depth map DR' corresponding to the warped right input image RI'.

DBIS processor 230*a* receives the warped left input image LI' on a first input and receives the warped left depth map DL' corresponding to the warped left input image LI' on a second input. DBIS processor 230*a* then performs the quantizing step, the scaling step, and the post-processing as described above in FIGS. 2 and 3 to produce the scaled and warped left output image LO'. Similarly, DBIS processor 230*b* receives the warped right input image RI' on a first input and receives the warped right depth map DR' corresponding to the warped right input image RI' on a second input. DBIS processor 230*b* then performs the quantizing step, the scaling step, and the post-processing as described above in FIGS. 2 and 3 to produce the scaled and warped right output image RO'. The scaled and warped left and right output images, LO' and RO', form a stereoscopic pair that may be viewed as 3D content on a 3D TV by the viewer.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A system configured to perform depth-based scaling of 3D content based on user input, the system comprising:
a content source configured to provide an input image comprising a plurality of input image objects;
a user input configured to receive a user input control signal that control an amount of change in a perceived depth of at least one of the plurality of input image objects; and
a processor configured to receive the user input control signal, to receive the input image, and to receive a depth map comprising depth data associated with each of the plurality of input image objects, wherein the processor generates therefrom an output image comprising a plurality of output image objects, each of the plurality of output image objects corresponding to one of the plurality of input image objects, and wherein the processor scales a size of a first output image object in cooperation with scaling a size of a second output image object based on first selected depth data associated with the first output image object and based on second selected depth data associated with the second output image object, wherein at least one of the first and second selected depth data is selected in response to the user input control signal, wherein the first output image object is processed before the second output image object, and wherein the first output image object has a greater assigned depth than the second output image object.

2. The system as set forth in claim 1, wherein the first output image object is closer to a viewer of the 3D content than the second output image object and the processor scales the size of the first output image object by a larger factor than the size of the second output image object.

3. The system as set forth in claim 1, wherein the processor is configured to quantize the depth map into a plurality of layers, where each layer of the plurality of layers is associated with one of the plurality of input image objects of the input image.

4. The system as set forth in claim 3, wherein the processor is further configured to perform individual spatial two-dimensional scaling of each of the input image objects.

5. The system as set forth in claim 4, wherein the processor is further configured to horizontally and vertically scale each of the input image objects by a corresponding scaling factor.

6. The system as set forth in claim 5, wherein the corresponding scaling factor is one of a set of scaling factors, the set of scaling factors defined by means of a one dimensional function.

7. The system as set forth in claim 6, wherein the one dimensional function is a monotonically increasing function.

8. An integrated circuit configured to perform depth-based scaling of 3D content in response to a viewer input control signal, wherein the integrated circuit is configured to:
receive an input image comprising a plurality of input image objects;
receive the viewer input control signal that directs a change in perceived depth of at least one of the plurality of input image objects;
receive a depth map comprising depth data associated with each of the plurality of input image objects; and
generate from the viewer input control signal, the input image, and the depth map an output image comprising a plurality of output image objects, each of the plurality of output image objects corresponding to one of the plurality of input image objects, and wherein the integrated circuit scales a size of a first output image object in cooperation with scaling a size of a second output image object based on first selected depth data associated with the first output image object and based on second selected depth data associated with the second output image object, wherein at least one of the first and second selected depth data is selected in response to the viewer input control signal, wherein the first output image object is processed before the second output image object, and wherein the first output image object has a greater assigned depth than the second output image object.

9. The integrated circuit as set forth in claim 8, wherein the first output image object is closer to a viewer of the 3D content than the second output image object and the integrated circuit scales the size of the first output image object by a larger factor than the size of the second output image object.

10. The integrated circuit as set forth in claim 8, wherein the integrated circuit is configured to quantize the depth map into a plurality of layers, where each layer of the plurality of layers is associated with one of the plurality of input image objects of the input image.

11. The integrated circuit as set forth in claim 10, wherein the integrated circuit is further configured to perform individual spatial two-dimensional scaling of each of the input image objects.

12. The integrated circuit as set forth in claim 11, wherein the integrated circuit is further configured to horizontally and vertically scale each of the input image objects by a corresponding scaling factor.

13. The integrated circuit as set forth in claim 12, wherein the corresponding scaling factor is one of a set of scaling factors, the set of scaling factors defined by means of a one-dimensional function.

14. The integrated circuit as set forth in claim 13, wherein the one-dimensional function is a monotonically increasing function.

15. A method for performing depth-based scaling of 3D content in response to a viewer input control signal, the method comprising:
receiving an input image comprising a plurality of input image objects;
receiving the viewer input control signal, the viewer input control signal arranged to direct a change in perceived depth of at least one of the plurality of input image objects;
receiving a depth map comprising depth data associated with each of the plurality of input image objects; and
generating from the viewer input control signal, the input image, and the depth map, an output image comprising a plurality of output image objects, each of the plurality of output image objects corresponding to one of the plurality of input image objects, and wherein a size of a first output image object is scaled in cooperation with scaling a size of a second output image object based on first selected depth data associated with the first output image object and based on second selected depth data associated with the second output image object, wherein at least one of the first and second selected depth data is selected in response to the viewer input control signal, wherein the first output image object is processed before the second output image object, and wherein the first output image object has a greater assigned depth than the second output mage object.

16. The method as set forth in claim 15, wherein the first output image object is closer to a viewer of the 3D content than the second output image object, and wherein generating the output image comprises scaling the size of the first output image object by a larger factor than the size of the second output image object.

17. The method as set forth in claim 15, wherein generating the output image comprises quantizing the depth map into a plurality of layers, where each layer of the plurality of layers is associated with one of the plurality of input image objects of the input image.

18. The method as set forth in claim 17, wherein generating the output image comprises performing individual spatial two-dimensional scaling of each of the input image objects.

19. The method as set forth in claim 18, wherein generating the output image comprises horizontally and vertically scaling each of the input image objects by a corresponding scaling factor.

20. The method as set forth in claim 19, wherein the corresponding scaling factor is one of a set of scaling factors, the set of scaling factors defined by means of a one dimensional function.

* * * * *

UNITED STATES PATENT AND TRADEMARK OFFICE
CERTIFICATE OF CORRECTION

PATENT NO. : 9,838,669 B2
APPLICATION NO. : 13/592963
DATED : December 5, 2017
INVENTOR(S) : Eduardo R. Corral-Soto

Page 1 of 1

It is certified that error appears in the above-identified patent and that said Letters Patent is hereby corrected as shown below:

In the Claims

Column 10, Line 18:
"assigned depth than the second output mage object." should read, -- assigned depth than the second output image object. --

Signed and Sealed this
Sixteenth Day of July, 2019

Andrei Iancu
*Director of the United States Patent and Trademark Office*